United States Patent
Nagata et al.

(10) Patent No.: US 6,857,663 B2
(45) Date of Patent: Feb. 22, 2005

(54) PIPING JOINT STRUCTURE

(75) Inventors: Tadaaki Nagata, Saitama (JP); Hajime Shogase, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/283,269

(22) Filed: Oct. 30, 2002

(65) Prior Publication Data

US 2003/0132631 A1 Jul. 17, 2003

(30) Foreign Application Priority Data

Oct. 31, 2001 (JP) ........................................ 2001-335594

(51) Int. Cl.⁷ .............................................. F16L 35/00
(52) U.S. Cl. ......................... 285/81; 285/319; 285/921
(58) Field of Search ................................ 285/305, 308, 285/319, 921, 81

(56) References Cited

U.S. PATENT DOCUMENTS

| | | | | |
|---|---|---|---|---|
| 4,793,637 A | * | 12/1988 | Laipply et al. ................ | 285/39 |
| 5,324,082 A | * | 6/1994 | McNaughton et al. ......... | 285/93 |
| 5,803,512 A | * | 9/1998 | Hollnagel .................... | 285/319 |
| 5,806,898 A | * | 9/1998 | Hollnagle .................... | 285/86 |
| 6,186,561 B1 | * | 2/2001 | Kaishio et al. .............. | 285/319 |
| 6,199,916 B1 | * | 3/2001 | Klinger et al. ........... | 285/288.1 |
| 6,227,173 B1 | * | 5/2001 | Bennett ....................... | 123/468 |
| 6,494,498 B2 | * | 12/2002 | Brandt et al. ............... | 285/319 |
| 2002/0053797 A1 | * | 5/2002 | Vierneisel et al. .......... | 285/305 |

OTHER PUBLICATIONS

Patent Abstract of Japan No. 07267184 A; Kobayashi Noboru; Oct. 17, 1995; Water Jet Propuslion Boat.
Patent Abstract of Japan No. 11201355 A; Kodama Tsutomu et al.; Jul. 30, 1999; "Quick Connector and Member for Holding the Connector".

* cited by examiner

*Primary Examiner*—James M. Hewitt
(74) *Attorney, Agent, or Firm*—Birch, Stewart, Kolasch & Birch, LLP

(57) ABSTRACT

A piping joint includes a male member or joint fastened to a female member or socket by locking pawls of a retainer sleeve onto pawl engaging portions. By pressing a flange by the tip ends of the pawls, the male member (joint) can be disengaged from the female member (socket) by reducing the diameter of the retainer sleeve and disengaging the pawls from the pawl engaging portions. A ring member is formed of an elastic material and is inserted between the retainer sleeve and a cylinder portion in a locked condition. A reduction of the diameter of the retainer sleeve is prevented by the presence of the ring member. Therefore, the connecting or detaching of the piping joint can be carried out in a condition where a holding force of the piping joint is maintained.

17 Claims, 8 Drawing Sheets

COMPARATIVE EXAMPLE

EMBODIMENT

PIPING JOINT STRUCTURE

CROSS-REFERENCES TO RELATED APPLICATIONS

This nonprovisional application claims priority under 35 U.S.C. § 119(a) on Patent Application No. 2001-335594 filed in Japan on Oct. 31, 2001, the entirety of which is herein incorporated by reference.

BACKGROUND OF THE INVENTION

1. Field of the Invention

The present invention relates to a piping joint structure, and more particularly to a piping joint structure in which a male member can be detachably connected to a female member.

2. Description of the Background Art

Piping joint structures have been available in the background art. For example, (1) "Water Jet Propulsion Watercraft" described in Japanese Patent Laid-open No. Hei 7-267184, and (2) "Quick Connector and Holding Member Thereof" described in Japanese Patent Laid-open No. Hei 11-201355, the entirety of each of which is hereby incorporated by reference, are representative of joint structures of the background art.

According to FIG. 6 of the 7-267184 publication, an oil supply pipe 79 is inserted into an auxiliary fuel tank 71, a transfer pipe 74 is connected to the oil supply pipe 79 through a joint 78, the transfer pipe 74 is connected to a main fuel tank 76, and oil in the auxiliary fuel tank 71 is transferred into the main fuel tank 76 by a manual pump 75 provided in the transfer pipe 74.

An example of the joint 78 in the 7-267184 publication above is further described in the 11-201355 publication. According to FIG. 1 of the 11-201355 publication, a quick connector (hereinafter referred to as "piping joint") is provided in which a male member 1 can be connected to a female member 2 by inserting the male member 1 into the female member 2 through a holding member 3. The male member 1 can be detached from the female member 2 by reducing the diameter of the holding member 3.

The present inventors have determined that the background art suffers from the following problems or disadvantages. For example, the piping joint as above-mentioned is covered with a cover in many cases so that the piping joint will not be disengage during inspection work by the careless touch of an operator or mechanic. However, when the piping joint is covered with a cover, the cover must be removed at the time of disengaging the piping joint, so that ease of workability when connecting or detaching the piping joint is decreased with the aforementioned arrangements of the background art. Therefore, a need in the background art has been identified by the present inventors for a desirable protective measure for these piping joints, e.g., a measure that will not impair the workability of the piping joint.

SUMMARY OF THE INVENTION

The present invention overcomes the shortcomings associated with the background art and achieves other advantages not realized by the background art.

An object of the present invention is to provide a piping joint structure having protective measures that do not impair the ease of workability of the piping joint, e.g., when connecting or detaching the piping joint.

One or more of these and other objects are accomplished by a piping joint structure comprising a female member having a fitting hole; a male member having a cylinder portion capable of being inserted into the fitting hole; a flange being provided on the cylinder portion; a retainer sleeve being capable of being enlarged and reduced between a large diameter and a smaller diameter, wherein the retainer sleeve is capable of being operatively engaged with the cylinder portion; a pawl projecting diametrically outwards from the retainer sleeve; a pawl engaging portion provided in at least one of the female member or the male member for locking the retainer sleeve, wherein the male member can be fastened to the female member by locking the pawl of the retainer sleeve onto the pawl engaging portion and pressing the flange by a tip end of the pawl; and a ring member capable of being inserted between the retainer sleeve and the cylinder portion in a locked condition, wherein a reduction of the diameter of the retainer sleeve to the smaller diameter is prevented by the presence of the ring member.

One or more of these and other objects are further accomplished by a piping joint structure comprising a female member having a fitting hole; a male member having a cylinder portion capable of being inserted into the fitting hole; a flange being provided on the cylinder portion; a retainer sleeve being capable of being enlarged and reduced between a large diameter and a smaller diameter, wherein the retainer sleeve is capable of being operatively engaged with the cylinder portion; a pawl projecting diametrically outwards from the retainer sleeve; a pawl engaging portion provided in at least one of the female member or the male member for locking the retainer sleeve, wherein the male member can be fastened to the female member by locking the pawl of the retainer sleeve onto the pawl engaging portion and pressing the flange by a tip end of the pawl; and a ring member capable of being inserted between the retainer sleeve and the cylinder portion in a locked condition, wherein a reduction of the diameter of the retainer sleeve to the smaller diameter is prevented by the presence of the ring member and the ring member is constructed of an elastic material.

One or more of these and other objects are further accomplished by a fuel tank structure comprising a fuel tank; a fuel pump; a feed-side hose; and a piping joint structure, wherein the piping joint structure includes a female member having a fitting hole, wherein the female member is a socket for a feed-side hose of the fuel tank; a male member having a cylinder portion capable of being inserted into the fitting hole, wherein the male member is a portion of a fuel pump for the fuel tank; a flange being provided on the cylinder portion; a retainer sleeve being capable of being enlarged and reduced between a large diameter and a smaller diameter, wherein the retainer sleeve is capable of being operatively engaged with the cylinder portion; a pawl projecting diametrically outwards from the retainer sleeve; a pawl engaging portion provided in at least one of the female member or the male member for locking the retainer sleeve, wherein the male member can be fastened to the female member by locking the pawl of the retainer sleeve onto the pawl engaging portion and pressing the flange by a tip end of the pawl; and a ring member capable of being inserted between the retainer sleeve and the cylinder portion in a locked condition, wherein a reduction of the diameter of the retainer sleeve to the smaller diameter is prevented by the presence of the ring member and the ring member is constructed of an elastic material.

The piping joint is a joint in which the male member can be fastened to the female member by locking the pawl of the retainer sleeve onto the pawl engaging portion and pressing the flange by the tip end of the pawl. The male member can be disengaged from the female member by reducing the diameter of the retainer sleeve and disengaging the pawl from the pawl engaging portion. For example, the absence of a member for covering the surroundings of the piping joint would be preferable.

The ring member formed of an elastic material is provided which is inserted between the retainer sleeve and the cylinder portion in a locked condition. The ring member formed of an elastic material is inserted between the retainer sleeve and the cylinder portion in a locked condition. The reduction of the diameter of the retainer sleeve is prevented by the presence of the ring member. Therefore, even if piping joint is inadvertently touched during work or inspection, the piping joint would not be disengaged. Accordingly, the connecting or detaching of the piping joint can be accomplished in a condition where a holding force of the piping joint is maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
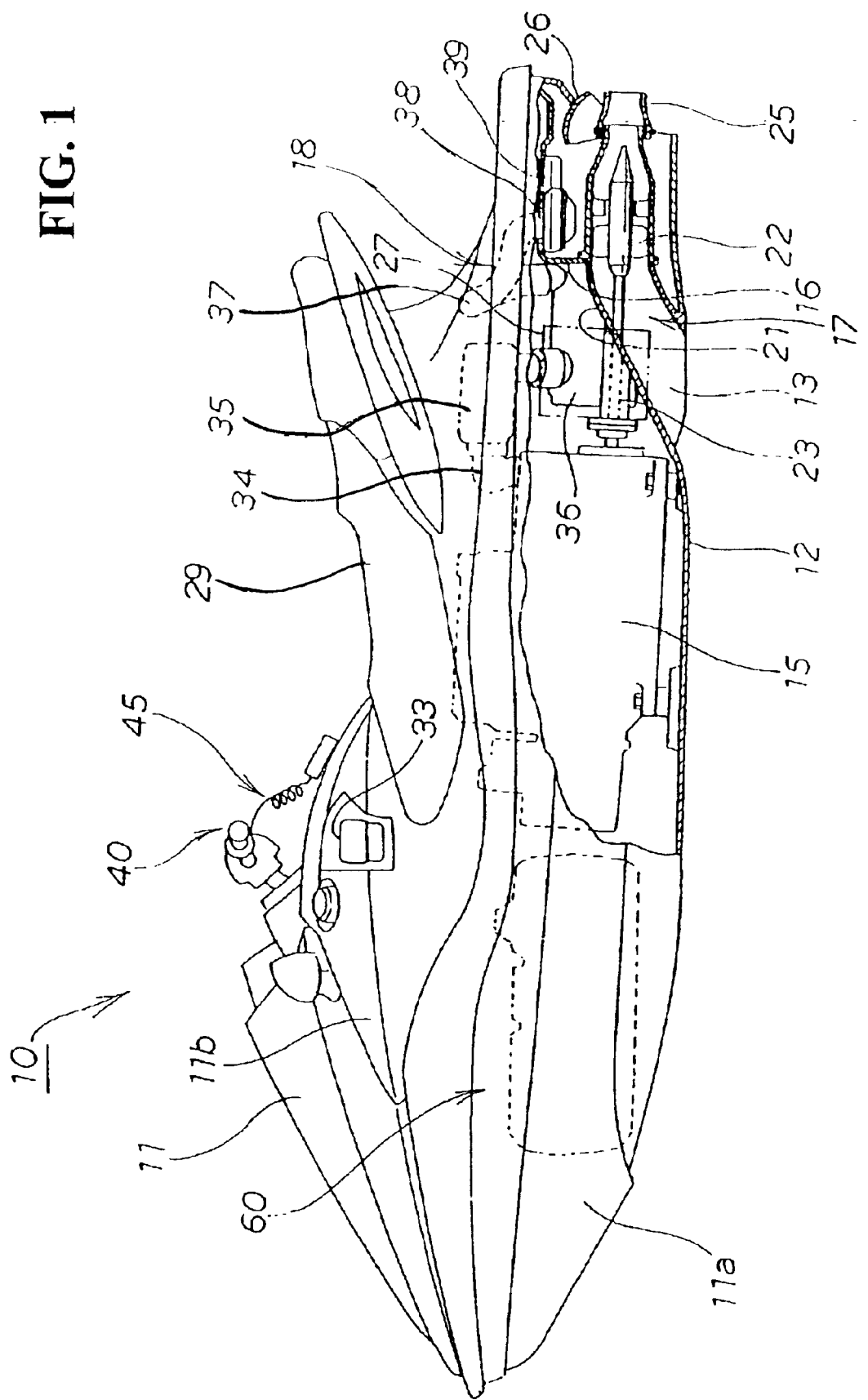
FIG. 1 is a side view of a personal watercraft having a piping joint structure according to the present invention.
Figure 2:
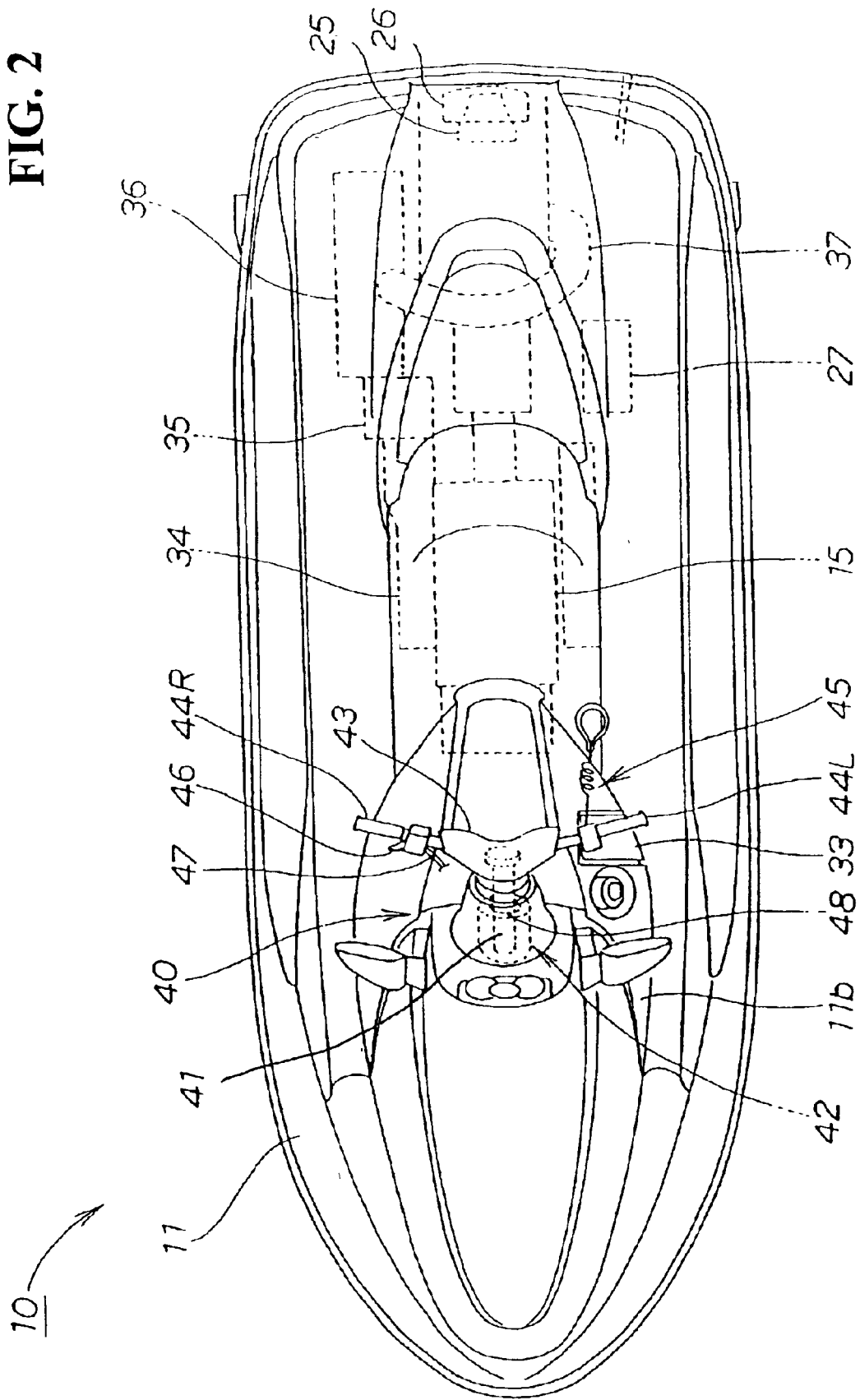
FIG. 2 is a plan view of the personal watercraft having the piping joint structure according to the present invention.
Figure 3:
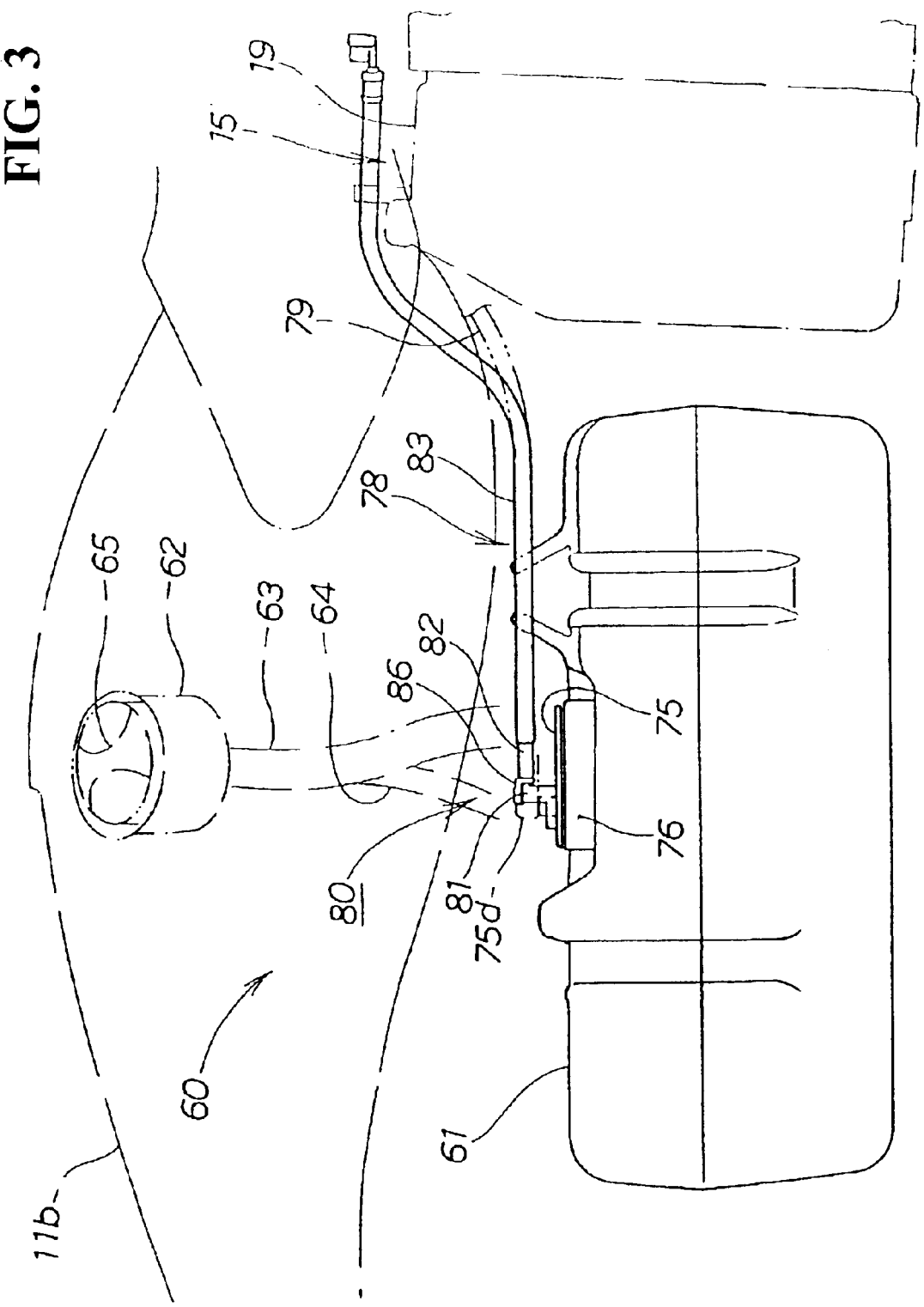
FIG. 3 is a side view of a fuel tank having the piping joint structure according to the present invention.
Figure 4:
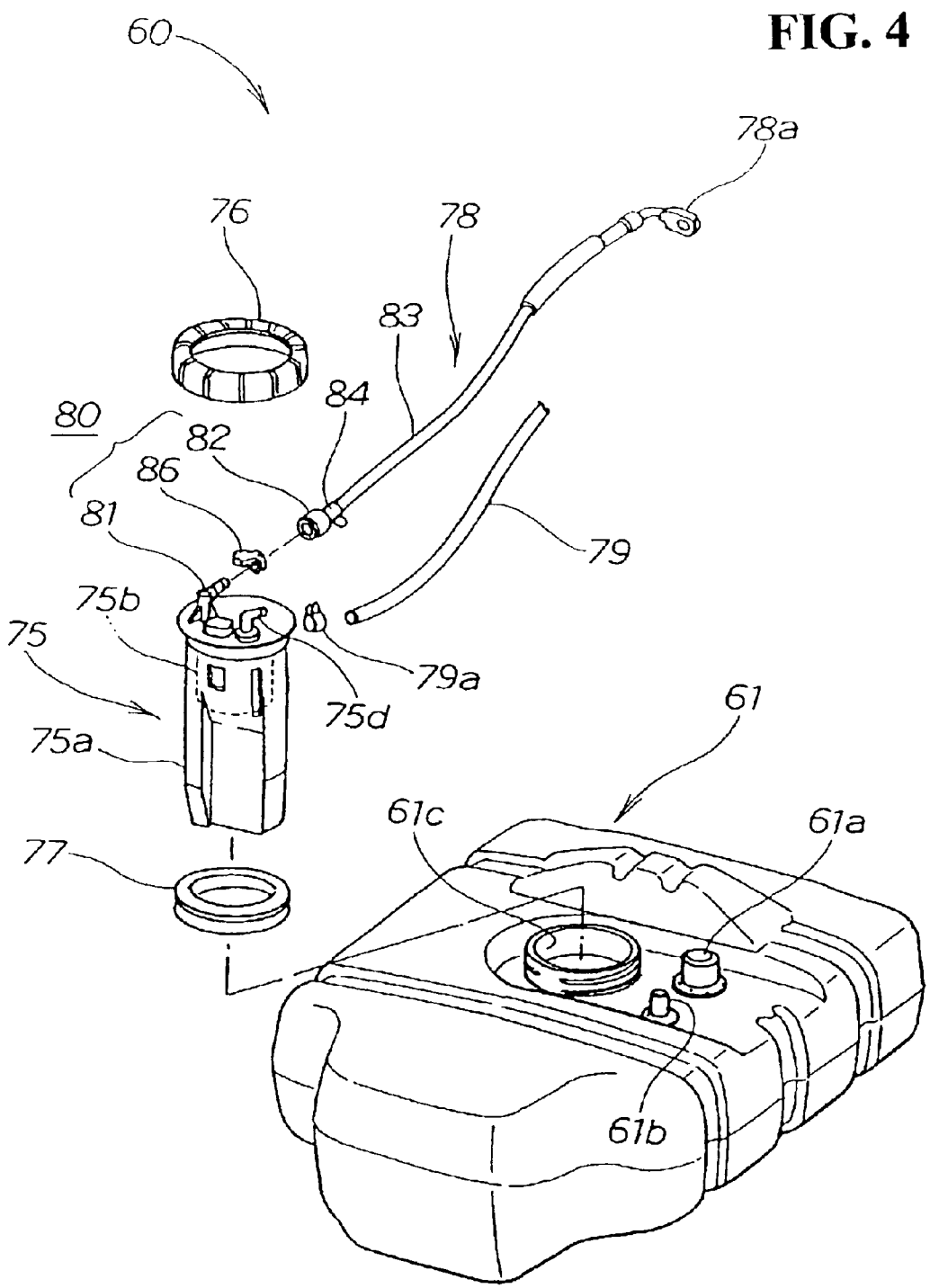
FIG. 4 is an exploded, perspective view of the fuel tank having the piping joint structure according to the present invention.
Figure 5:
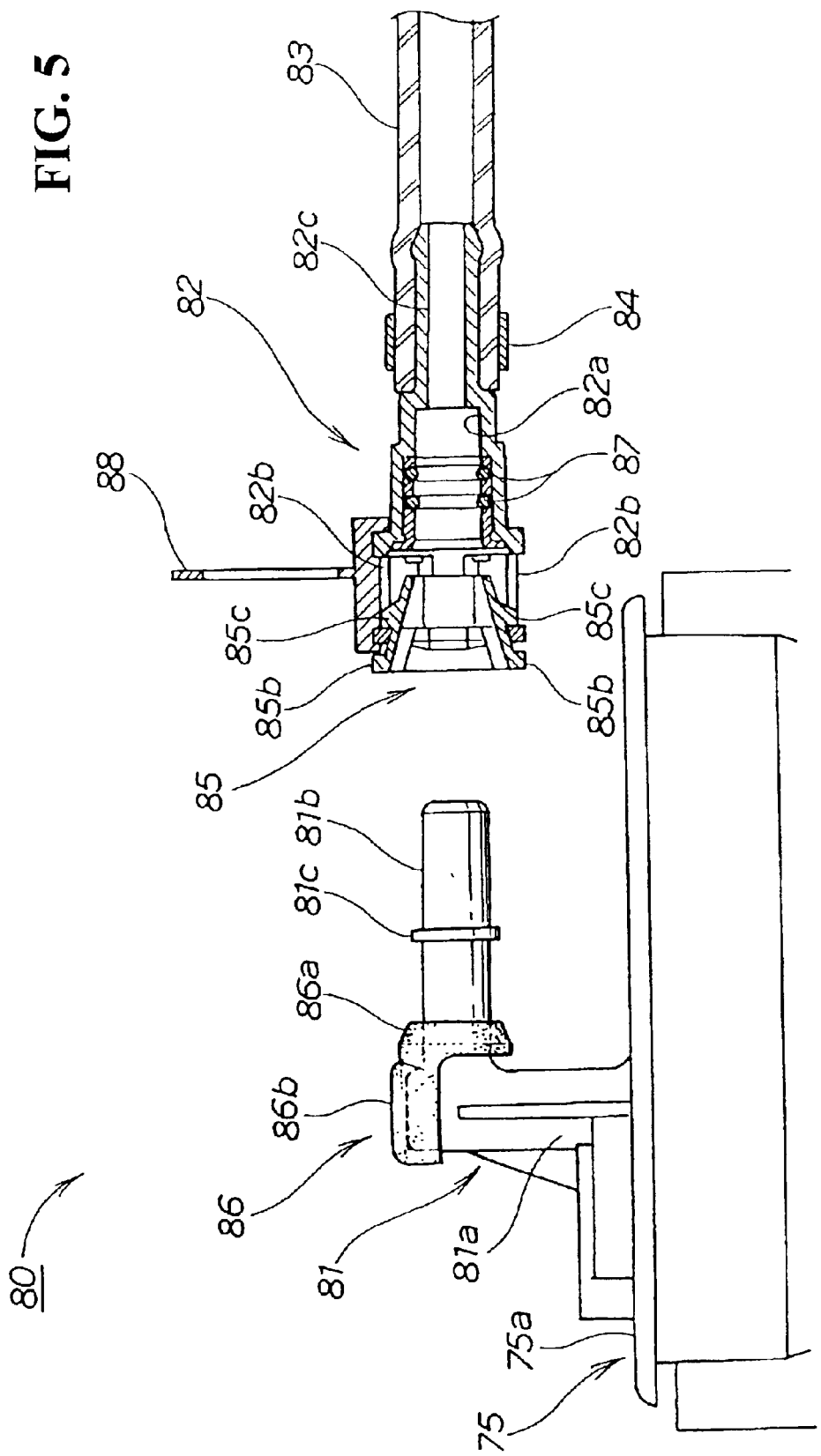
FIG. 5 is a frontal, sectional view of the piping joint structure according to the present invention in a disengaged condition.
Figure 6:
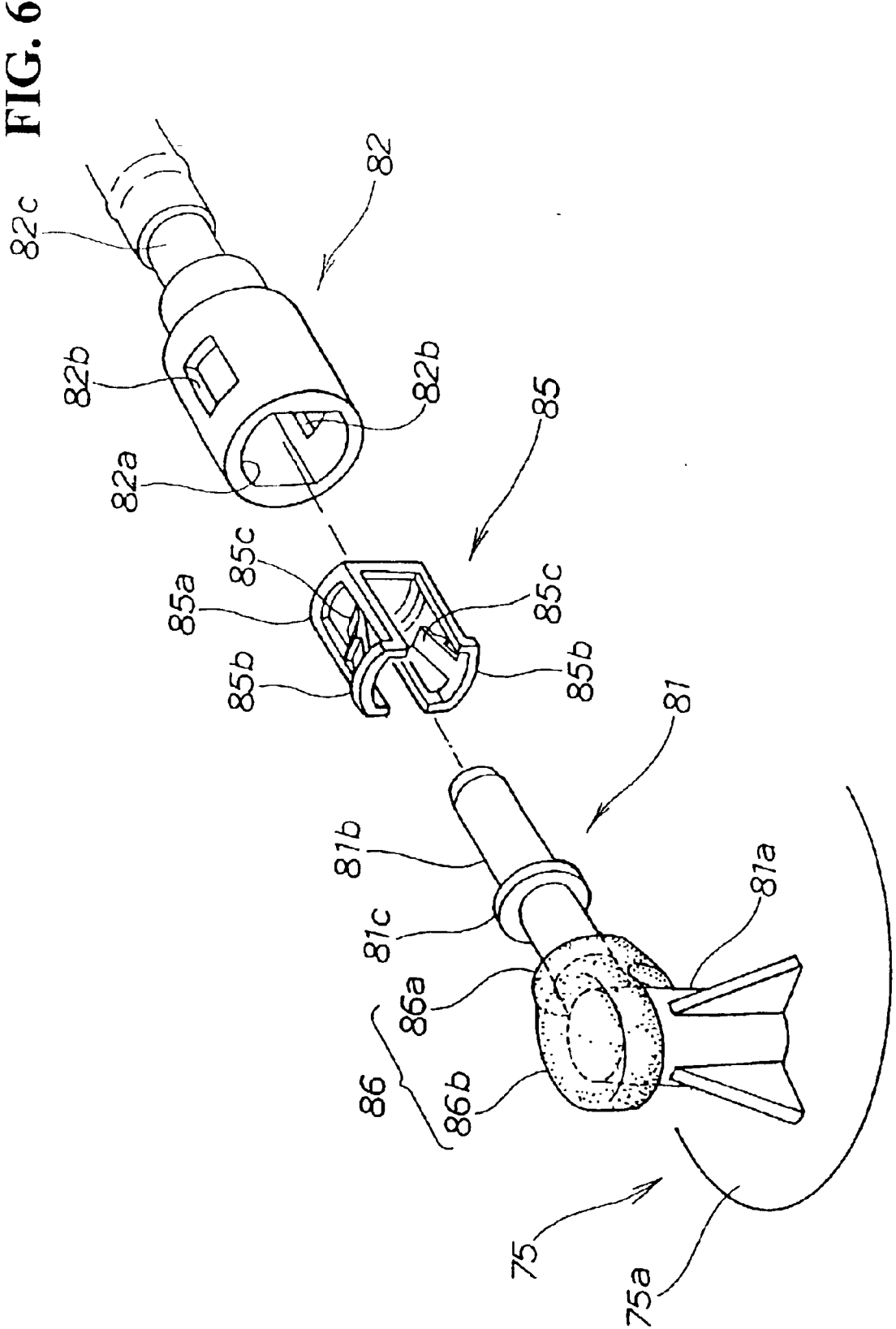
FIG. 6 is an exploded, perspective view of portions of the piping joint structure according to the present invention.
Figure 7:
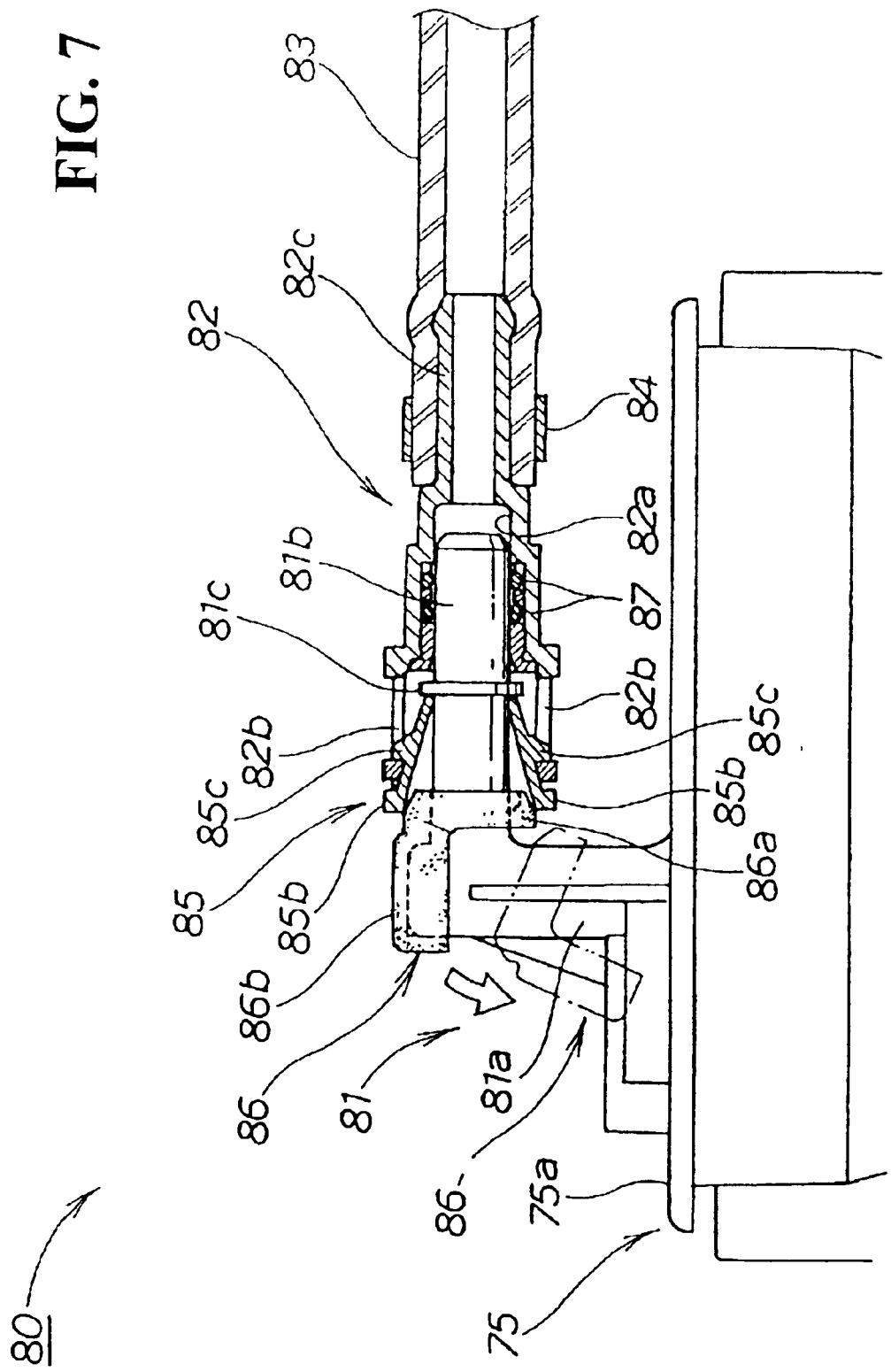
FIG. 7 is a frontal, sectional view of the piping joint structure according to the present invention in a connected condition.
Figure 8A:
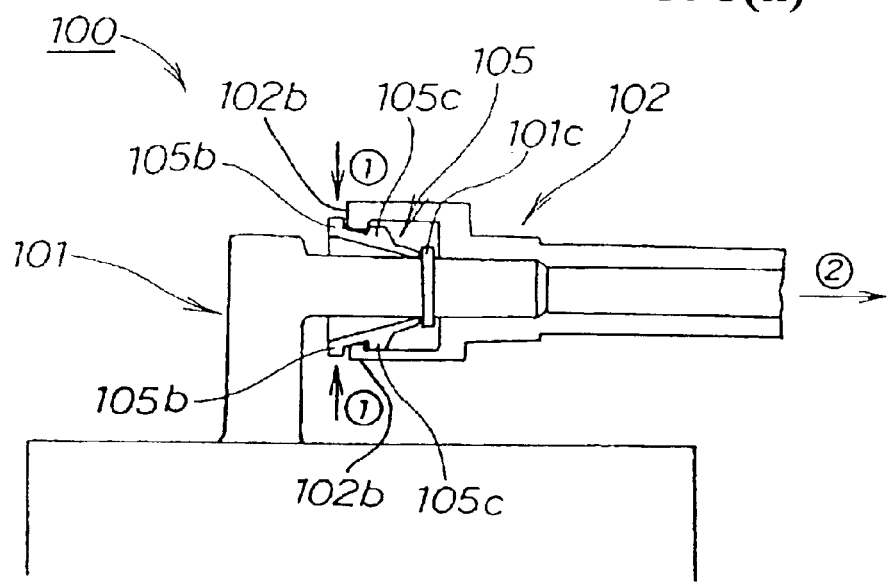
FIGS. 8(a) and 8(b) are views of the piping joint structure according to the present invention and a comparative example.
Figure 8B:
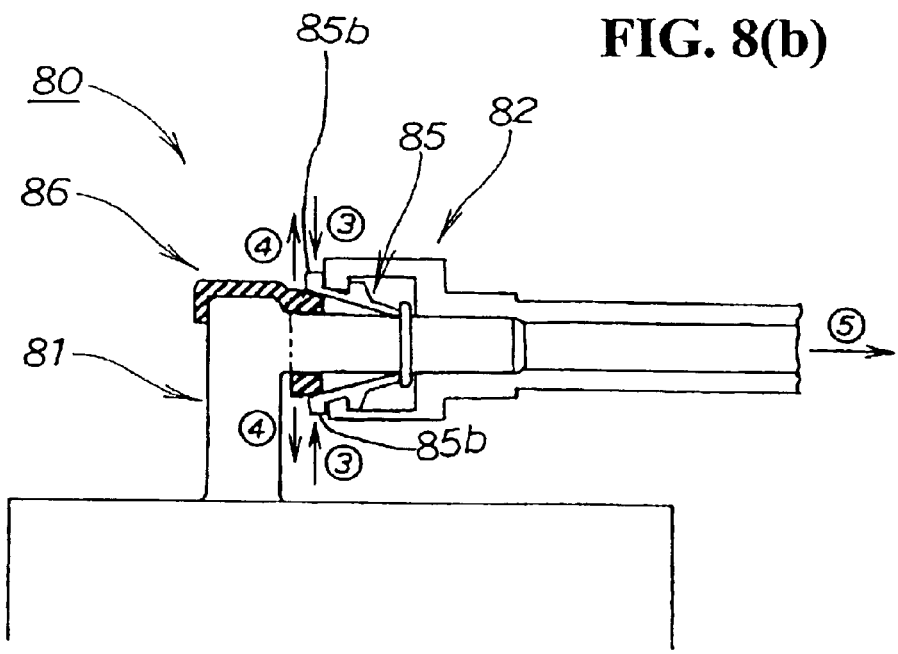

An embodiment of the present invention will hereinafter be described with reference to the accompanying drawings. FIG. 1 is a side view of a personal watercraft having a piping joint structure according to the present invention. FIG. 2 is a plan view of the personal watercraft having the piping joint structure according to the present invention. FIG. 3 is a side view of a fuel tank having the piping joint structure according to the present invention. FIG. 4 is an exploded, perspective view of the fuel tank having the piping joint structure according to the present invention. FIG. 5 is a frontal, sectional view of the piping joint structure according to the present invention in a disengaged condition. FIG. 6 is an exploded, perspective view of portions of the piping joint structure according to the present invention. FIG. 7 is a frontal, sectional view of the piping joint structure according to the present invention in a connected condition. FIGS. 8(a) and 8(b) are views of the piping joint structure according to the present invention and a comparative example.

FIG. 1 is a side view of a personal watercraft having a piping joint structure according to the present invention. The personal watercraft 10 includes a fuel tank 60 fitted to a front portion 11a of a watercraft body 11, an engine 15 provided on the rear side of the fuel tank 60, a pump chamber 16 provided on the rear side of the engine 15, a jet propeller 17 provided in the pump chamber 16, and an exhaust unit 18 with a suction side thereof fitted to the engine 15 and with an exhaust side thereof fitted to the pump chamber 16. A steering device 40 is fitted to the upper side of the fuel tank 60, and a seat 29 is fitted on the rear side of the steering device 40.

The jet propeller 17 includes a housing 21 extending rearwards from an opening 13 formed in a watercraft bottom 12. An impeller 22 is rotatably fitted in the housing 21, and the impeller 22 is connected to a drive shaft 23 of the engine 15. According to the jet propeller 17, with the engine 15 driven to rotate the impeller 22, water drawn into the opening 13 of the watercraft bottom 12 can be jetted to the rear side of the watercraft body 11 through a rear end opening of the housing 21 to the steering pipe 25. The steering pipe 25 is a member fitted to the rear end of the housing 21 so as to be swingable to left and right directions. The steering nozzle 25 controls the steering direction of the watercraft body 11 by being turned to the left and right directions by an operation of the steering device 40.

The exemplary personal watercraft 10 is a jet propulsion watercraft in which a fuel is supplied from the fuel tank 60 to the engine 15 to drive the engine 15. The driving force of the engine 15 is transmitted through the drive shaft 23 to the impeller 22, and the impeller 22 is rotated to draw water through the opening 13 of the watercraft bottom 12. The water drawn in is jetted through the rear end of the housing 21 to the steering pipe 25 and the personal watercraft 10 is propelled.

A deck 11b forming the upper portion of the watercraft body 11, and a reverse bucket 26 made to cover the steering pipe 25 and to cause a water jet to flow in a forward and downward, skewed direction at the time of propelling the watercraft backwards is also provided. A battery 27 provides a power source for the watercraft body 11. The watercraft body 11 also incorporates an operation knob 33 for operating the reverse bucket 26, an exhaust pipe 34, an exhaust body 35, a water muffler 36, a water lock pipe 37, a tail pipe 38, and a resonator 39.

FIG. 2 is a plan view of the personal watercraft having the piping joint structure according to the present invention. The steering device 40 includes a steering shaft 41 rotatably fitted to the watercraft body 11, a handle holder 42 rotatably fitted to the steering shaft 41, a handle 43 fitted to the upper end of the steering shaft 41, left and right handle grips 44L and 44R fitted respectively to left and right end portions of the handle 43, a main switch 45 provided with a lanyard switch provided at a base portion of the left handle grip 44L, and a throttle lever 46 swingably fitted to a base portion of the right handle grip 44R. A throttle cable 47 extended from the throttle lever 46 to a throttle, and a holding member 48 for supporting the steering shaft 41 and holding it on the handle holder 42 are also provided and shown in FIG. 2.

FIG. 3 is a side view of the fuel tank having the piping joint structure according to the present invention. The fuel tank 60 includes a main body portion 61 for reserving a supply of fuel, an oil supply port member 62 for pouring the fuel, a fuel supply hose 63 for connecting the main body portion 61 and the oil supply port member 62, a breather hose 64 for maintaining the tank pressure in the main body portion 61 at a constant value, and an oil supply cap 65 for closing the oil supply port member 62. A feed-side hose 78 for feeding the fuel from the main body portion 61 to the engine 15, and a return hose 79 for returning the residual fuel that does not flow into a carburetor (not shown) of the engine 15 to the main body portion 61 are provided for in operative engagement with the fuel tank 60. An oil tank 19 is integrally provided on the front side of the engine 15 for stocking a lubricating oil, and the feed-side hose 78 (a fuel hose 83) is supported on the oil tank 19.

FIG. 4 is an exploded, perspective view of the fuel tank having the piping joint structure according to the present invention. The main body portion 61 is a tank made of resin and includes a first connection port 61a for connecting the fuel supply hose 63 (See FIG. 3). A second connection port 61b for connecting the breather hose 64 (See FIG. 3), and an opening 61c for fitting a fuel pump 75 are also provided. The main body 61 is provided with the fuel pump 75, a fixing ring 76 for fixing the fuel pump 75, and a packing 77 provided intermediately between the main body portion 61 and the fuel pump 75. The fuel pump 75 includes a housing 75a, a pump main body 75b contained in the housing, a joint 81 provided at an upper portion of the housing 75a as a male member for feeding the fuel, and a return port 75d provided at an upper portion of the housing 75a.

The feed-side hose 78 includes a socket 82 as a female member detachably connected to a socket 81 of the fuel pump 75, the fuel hose 83 having one end thereof connected to the socket 82, and a connection portion 78a provided at the other end of the fuel hose 83 for connection to the side of the engine 15 (See FIG. 3). A hose band 79a for fastening the return-side hose to the return port 75d is also provided. The piping joint structure according to the present invention is a structure of a piping joint 80 including the joint 81, the socket 82, and the ring member 86 as main components. The details of the piping joint structure will be described in greater detail hereinafter.

FIG. 5 is a frontal, sectional view of the piping joint structure according to the present invention in a disengaged condition. The structure of the piping joint 80 includes the joint 81 of the fuel pump as a male member, the socket 82 as a female member having one end thereof connected to the joint 81, the fuel hose 83 fitted to the other end of the socket 82, a band 84 for fastening the fuel hose 83, a retainer sleeve 85 for locking the joint 81 inserted into the socket 82, a ring member 86 fitted to the joint 81 for preventing reduction of the diameter of the retainer sleeve 85, a plurality of O-rings 87, 87 provided intermediately between the joint 81 and the socket 82, and a pull tab 88 for tentatively fixing the retainer sleeve 85 to the socket 82.

FIG. 6 is an exploded, perspective view of portions of the piping joint structure according to the present invention, and shows the joint 81, the socket 82, and the retainer sleeve 85. The joint 81 includes a vertical pipe 81a projected from an upper portion of the housing 75a, a cylinder portion 81b extended laterally from the vertical pipe 81a, and a flange 81c provided on the cylinder portion 81b. The socket 82 includes a fitting hole 82a, which is formed at one end and into which the joint 81 can be inserted together with the retainer sleeve 85. The socket 82 also includes pawl engaging portions 82b, 82b formed in an insertion portion 82a for stopping the retainer sleeve 85, and a connection portion 82c provided at the other end for connecting the fuel hose 83.

The retainer sleeve 85 is a member integrally formed from a resin and is provided with a frame body 85a, flange portions 85b, 85b formed on the frame body 85a so as to be abutted against one end of the socket 82, and pawls 85c, 85c extended respectively from the flange portions 85b, 85b for fitting to the pawl engaging portions 82b, 82b. The ring member 86 is a member formed of an elastic material such as rubber and includes a ring 86a to be fitted to the cylinder portion 81b of the joint 81 so as thereby to prevent reduction of the diameter of the retainer sleeve 85, and a cap 86b to be fitted onto the tip end of the vertical pipe 81a.

FIG. 7 is a frontal, sectional view of the piping joint structure according to the present invention in a connected condition. The piping joint 80 includes the female member (socket 82) including the fitting hole 82a; the male member (joint 81) having the cylinder portion 81b to be inserted into the fitting hole 82a; the flange 81c formed on the cylinder portion 81b; the retainer sleeve 85 capable of being enlarged and reduced in diameter, including the pawls 85c, 85c projecting diametrically outwards, and to be fitted to the cylinder portion 81b; and the pawl engaging portions 82b, 82b provided in the female member (socket 82) for locking the retainer sleeve 85.

The piping joint 80 is such that the male member (joint 81) can be fastened to the female member (socket 82) by locking the pawls 85c, 85c of the retainer sleeve 85 onto the pawl engaging portions 82b, 82b and pressing the flange 81c by the tip ends of the pawls 85c, 85c. The male member (joint 81) can be detached from the female member (socket 82) by reducing the diameter of the retainer sleeve 85 and disengaging the pawls 85c, 85c from the pawl engaging portions 82b, 82b. The structure of the piping joint 80 in that condition can be said that it includes the ring member 86 formed of an elastic material to be inserted between the retainer sleeve 85 and the cylinder portion 81b in a locked condition, and reduction of the diameter of the retainer sleeve 85 is prevented by the presence of the ring member 86.

The male member (joint 81) can be fastened to the female member (socket 82) by locking the pawls 85c of the retainer sleeve 85 onto the pawl engaging portions 82b and pressing the flange 81c by the tip ends of the pawls 85c. In addition, the male member (joint 81) can be disengaged from the female member (socket 82) by reducing the diameter of the retainer sleeve 85 and disengaging the pawls 85c from the pawl engaging portions 82b. For example, the absence of such a member as to cover the surroundings of the piping joint 80 is preferable. The ring member formed of an elastic material is provided that is inserted between the retainer sleeve 85 and the cylinder portion 81b in the locked condition.

The ring member 86 formed of an elastic material is provided, which is inserted between the retainer sleeve 85 and the cylinder portion 81b, in the locked condition. The reduction of the diameter of the retainer sleeve 85 is prevented by the presence of the ring member 86. Therefore, the piping joint 80 will not be disengaged, even if the piping joint 80 is inadvertently contacted during work. The connecting or detaching of the piping joint 80 can be carried out in a condition where a holding force of the piping joint 80 is maintained. In addition, with the ring member 86 fitted to the male member (joint 81), the ring member 86 can be inserted between the retainer sleeve 85 and the cylinder portion 81*b* in the locked condition. Therefore, it is possible to simplify the structure of the piping joint 80.

FIGS. 8(*a*) and 8(*b*) illustrate operating positions of the piping joint structure according to the present invention. FIG. 8(*a*) shows the structure of a piping joint 100 according to a comparative example, and FIG. 8(*b*) shows the structure of the piping joint 80 according to the present embodiment. In FIG. 8(*a*), the piping joint 100 is shown in the condition where pawls 105*c*, 105*c* of a retainer sleeve 105 are locked on pawl engaging portions 102*b*, 102*b* of a socket 102, and a flange 101*c* is pressed by the tip ends of the pawls 105*c*, 105*c*. The joint 101 is fitted to the socket 102 through the retainer sleeve 105.

When forces for reducing the diameter of the retainer sleeve 105 are exerted on flange portions 105*b*, 105*b* of the retainer sleeve 105 as indicated by arrows 1, 1, the forces resisting against the arrows 1, 1 are only elastic forces of the pawls 105*c*, 105*c* of the retainer sleeve 105, so that the socket 102 can be pulled out from the joint 101 as indicated by arrow 2.

In FIG. 8(*b*), for example, even if forces for reducing the diameter of the retainer sleeve 105 are exerted on the flange portions 85*b*, 85*b* of the retainer sleeve 85 as indicated by arrows 3, 3, forces resisting against the arrows 3, 3, namely, arrows 4, 4 are generated by the ring member 86, so that the socket 85 would not slip off from the joint 81 even in the case where a force for pulling the socket 85 off from the joint 81 is exerted on the socket 82 as indicated by arrow 5. Accordingly, the piping joint 80 is securely engaged even when the piping joint 80 is inadvertently contacted during maintenance or inspection.

In addition, by intentionally pulling the cap 86*b* of the ring member 86 as indicated by the void arrow in FIG. 7, the ring member 86 can be moved onto the vertical pipe 81*a* as indicated by the two dotted, chain line. It becomes possible to reduce the diameter of the retainer sleeve 85, and by reducing the diameter of the retainer sleeve 85, the socket 82 can be pulled off from the joint 81. While disengagement of the female member (socket 82) from the male member (joint 81) as shown in FIG. 7 has been described in the above embodiment, a structure in which the male member is disengaged from the female member may be adopted. In summary, the relationship between the male and the female may be reversed.

In addition, the structure of the piping joint 80 mounted on the fuel tank 60 of the personal watercraft 11 (See FIG. 1) as shown in FIG. 4 has been shown in the above embodiment. However, the piping joint is not limited to the piping joint of the fuel tank in the personal watercraft and may be a piping joint for general use.

The present invention constituted as described above displays the following effects. The ring member formed of an elastic material is provided in an locked condition and inserted between the retainer sleeve and the cylinder portion. A reduction of the diameter of the retainer sleeve is prevented by the presence of the ring member. Therefore, the piping joint remains securely engaged, even if the piping joint is inadvertently moved or contacted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piping joint structure comprising:
   a female member having a fitting hole;
   a male member having a cylinder portion capable of being inserted into said fitting hole;
   a flange being provided on said cylinder portion;
   a retainer sleeve being capable of being enlarged and reduced between a large diameter and a smaller diameter, wherein said retainer sleeve is capable of being operatively engaged with said cylinder portion;
   a pawl projecting diametrically outwards from said retainer sleeve;
   a pawl engaging portion provided in at least one of said female member or said male member for locking said retainer sleeve, wherein said male member can be fastened to said female member by locking said pawl of said retainer sleeve onto said pawl engaging portion and pressing said flange by a tip end of said pawl; and
   a ring member capable of being inserted between said retainer sleeve and said cylinder portion in a locked condition, said ring member including a ring portion having a ring opening and a cap portion having a cap opening, wherein said cap opening is positioned substantially normal to said ring opening, wherein a reduction of the diameter of said retainer sleeve to said smaller diameter is prevented by the presence of said ring member and said ring member is constructed of an elastic material.

2. The piping joint structure according to claim 1, wherein said pawl engaging portion is provided in said female member.

3. The piping joint structure according to claim 2, wherein said male member can be operatively disengaged from said female member by reducing the diameter of the retainer sleeve to said smaller diameter and releasing said pawl from said pawl engaging portion in an unlocked condition of said ring member.

4. The piping joint structure according to claim 3, wherein said male member includes a vertical pipe projecting downward from an intersection with said cylinder portion, said cylinder portion extends laterally from the vertical pipe.

5. The piping joint structure according to claim 2, wherein said male member includes a vertical pipe projecting downward from an intersection with said cylinder portion, said cylinder portion extends laterally from the vertical pipe.

6. The piping joint structure according to claim 2, wherein the pawl engaging portion of the female member are formed in an insertion portion for stopping the retainer sleeve, and a connection portion is provided at an other end of said female member for operatively connecting to a hose.

7. The piping joint structure according to claim 4, wherein the pawl engaging portion of the female member are formed in an insertion portion for stopping the retainer sleeve, and a connection portion is provided at an other end of said female member for operatively connecting to a hose.

8. The piping joint structure according to claim 2, wherein said retainer sleeve is integrally formed from a resin, said retainer sleeve including
   a frame body,
   flange portions being formed on the frame body and capable of being abutted against one end of the female member, and
   wherein said pawl extend respectively from the flange portions for operatively engaging with said pawl engaging portion.

9. The piping joint structure according to claim 7, wherein said retainer sleeve is integrally formed from a resin, said retainer sleeve including
   a frame body,
   flange portions being formed on the frame body and capable of being abutted against one end of the female member, and
   wherein said pawl extend respectively from the flange portions for operatively engaging with said pawl engaging portion.

10. A piping joint structure comprising:
   a female member having a fitting hole;
   a male member having a cylinder portion capable of being inserted into said fitting hole;
   a flange being provided on said cylinder portion;
   a retainer sleeve being capable of being enlarged and reduced between a large diameter and a smaller diameter, wherein said retainer sleeve is capable of being operatively engaged with said cylinder portion;
   a pawl projecting diametrically outwards from said retainer sleeve;
   a pawl engaging portion provided in at least one of said female member or said male member for locking said retainer sleeve, wherein said male member can be fastened to said female member by locking said pawl of said retainer sleeve onto said pawl engaging portion and pressing said flange by a tip end of said pawl; and
   a ring member capable of being inserted between said retainer sleeve and said cylinder portion in a locked condition, said ring member including a ring portion having a ring opening and a cap portion having a cap opening, wherein said cap opening is positioned substantially normal to said ring opening, wherein a reduction of the diameter of said retainer sleeve to said smaller diameter is prevented by the presence of said ring member.

11. The piping joint structure according to claim 1, wherein said male member can be operatively disengaged from said female member by reducing the diameter of the retainer sleeve to said smaller diameter and releasing said pawl from said pawl engaging portion in an unlocked condition of said ring member.

12. The piping joint structure according to claim 11, wherein said pawl engaging portion is provided in said female member.

13. A fuel tank structure comprising:
   a fuel tank;
   a fuel pump;
   a feed-side hose; and
   a piping joint structure, wherein said piping joint structure includes
      a female member having a fitting hole, wherein said female member is a socket for the feed-side hose of said fuel tank;
      a male member having a cylinder portion capable of being inserted into said fitting hole, wherein said male member is a portion of the fuel pump for said fuel tank;
      a flange being provided on said cylinder portion;
      a retainer sleeve being capable of being enlarged and reduced between a large diameter and a smaller diameter, wherein said retainer sleeve is capable of being operatively engaged with said cylinder portion;
      a pawl projecting diametrically outwards from said retainer sleeve;
      a pawl engaging portion provided in at least one of said female member or said male member for locking said retainer sleeve, wherein said male member can be fastened to said female member by locking said pawl of said retainer sleeve onto said pawl engaging portion and pressing said flange by a tip end of said pawl; and
      a ring member capable of being inserted between said retainer sleeve and said cylinder portion in a locked condition, said ring member including a ring portion having a ring opening and a cap portion having a cap opening, wherein said cap opening is positioned substantially normal to said ring opening, wherein a reduction of the diameter of said retainer sleeve to said smaller diameter is prevented by the presence of said ring member and said ring member is constructed of an elastic material.

14. The fuel tank structure according to claim 13, wherein said male member can be operatively disengaged from said female member by reducing the diameter of the retainer sleeve to said smaller diameter and releasing said pawl from said pawl engaging portion in an unlocked condition of said ring member.

15. The fuel tank structure according to claim 13, wherein the male member includes a vertical pipe projecting from an upper portion of a pump housing, said cylinder portion extending laterally from the vertical pipe.

16. The fuel tank structure according to claim 14, wherein the male member includes a vertical pipe projecting from an upper portion of a pump housing, said cylinder portion extending laterally from the vertical pipe.

17. The fuel tank structure according to claim 13, wherein said pawl engaging portion is provided in said female member.

* * * * *